United States Patent [19]

Takada

[11] Patent Number: 4,898,420
[45] Date of Patent: Feb. 6, 1990

[54] VEHICULAR OPENABLE ROOF HOOD

[75] Inventor: Yukiya Takada, Shizuoka, Japan

[73] Assignee: Suzuki Motor Company, Limited, Shizuoka, Japan

[21] Appl. No.: 330,127

[22] Filed: Mar. 29, 1989

[30] Foreign Application Priority Data

May 23, 1988 [JP] Japan .............................. 63-67690[U]

[51] Int. Cl.$^4$ ............................................. B60J 7/00
[52] U.S. Cl. .................................................. 296/219
[58] Field of Search ......................................... 296/219

[56] References Cited

U.S. PATENT DOCUMENTS

| 3,526,427 | 9/1970 | Trenkler et al. | 296/219 |
| 3,819,227 | 6/1974 | Carli | 296/219 |
| 4,066,292 | 1/1978 | Carli | 296/219 |

Primary Examiner—Robert R. Song
Attorney, Agent, or Firm—McGlew & Tuttle

[57] ABSTRACT

A vehicular openable roof hood for covering an opening portion on the upper surface of a roof of an automotive vehicle, the hood comprising a pair of arms adapted to turn about a pair of pivotal shafts on the roof, a hood securing plate fixed to the distal ends of the arms to immovably hold the distal end of the hood, a hood cloth extending round the upper surface and the front edge of the hood securing plate to be secured to the latter from the bottom side thereof and position fixing means for immovably holding the hood at a position where it is kept in an opened state, wherein the hood securing plate is immovably held at the position where the hood is opened by allowing a belt to be inserted and passed through an insert hole on the hood securing plate and the hood securing plate is formed with engagement holes through which engagement members are introduced, the engagement holes comprising a wide part and a narrow part, respectively, so that the engagement members are first inserted through the wide parts for bringing them in engagement with the hood securing plate and then displaced to the narrow parts in the lateral direction for preventing the engagement members from being disengaged from the engagement holes.

1 Claim, 2 Drawing Sheets

VEHICULAR OPENABLE ROOF HOOD

FIELD OF THE INVENTION AND RELATED ART STATEMENT

The present invention relates to a vehicular openable roof hood and more particularly to a roof hood of the type adapted to be opened or closed at an opening portion located above the front seats in an automotive vehicle.

A conventional roof hood of the foregoing type is typically constructed in the following manner.

FIG. 5 is a sectional view illustrating the conventional roof hood and FIG. 6 is a fragmental perspective view particularly illustrating a hood securing plate for the conventional roof hood as seen from the back side.

As shown in the drawings, a vehicular body includes ceiling frames 1a and 1b of which front side is covered with a surface member 2. A hood cloth 3 is attached to the upper surface of the surface member 2. The fore end part 3a of the hood cloth 3 extends round the front edge 4a of a hood securing plate 4, and substantially U-shaped engagement members 5 at the fore end part 3a of the hood cloth 3 are introduced into corresponding rectangular engagement holes 6 on the hood securing plate 4 so that they are brought in an engaged state.

The hood securing plate 4 is fixed to the upper ends of arms 8 adapted to turn about pivotal shafts 7 on the roof. When an opening portion (not shown) on the roof is closed with the hood, the arms 8 are tilted down to their horizontal positions. At this moment, the intermediate portion 3b of the hood cloth 3 is stretched by the hood securing plate 4.

On the other hand, when the opening portion is opened, the arms 8 are turned upwardly as shown in FIG. 5. To assure that the hood securing plate 4 is immovably held in the illustrated state, a belt guide 9 is attached to the bottom side of the hood cloth 3, as shown in FIG. 6. A belt 10 of which one end is fixed to the ceiling portion 1b passes through the belt guide 9 so that the fore end part of the belt 10 is kept in a fixed state using a Velcro fastener 11 (registered trademark). Consequently, the hood cloth 3 is drawn in the direction identified by an arrow mark in FIG. 5 so that the engagement members 5, are not disengaged from the engagement holes 6. Thus, the belt 10 and the Velcro fastener 11 serve as position fixing means. If the belt 10 is not used, it is hung from a snap hook 12 on the surface member 2.

With such a conventional roof hood, there is a need of determining dimensions of both the belt guide 9 and the belt 10 at a considerably high accuracy. Other problem is that a hard task is required so as to allow the belt 10 to pass through the belt guide 9.

Another problem is that if the engagement holes 6 through which the engagement members 5 are inserted so as to allow them to be brought in an engaged state have a wide width, the engagement members 5 tend to be disengaged from the engagement holes 6 and if they have a narrow width, it is difficult to perform an engaging operation.

OBJECT AND SUMMARY OF THE INVENTION

The present invention has been made with the foregoing background in mind and its object resides in providing a vehicular openable roof hood which is entirely free from the aforementioned problems.

To accomplish the above object, the present invention provides a vehicular openable roof hood for covering an opening portion on the upper surface of a roof of an automotive vehicle, the hood comprising a pair of arms adapted to turn about a pair of pivotal shafts on the roof, a hood securing plate fixed to the distal ends of the arms to immovably hold the distal end of the hood, a hood cloth extending round the upper surface and the front edge of the hood securing plate to be secured to the latter from bottom side thereof and position fixing means for immovably holding the hood at a position where it is kept opened, wherein the hood cloth is provided with a plurality of engagement members each having a substantially U-shaped sectional configuration at the distal end thereof so as to allow it to be secured to the hood securing plate, the hood securing plate is formed with a plurality of key-shaped holes through which the engagement members are introduced so as to allow them to be held in an engaged state as well as an insert hole through which position fixing means is inserted, each of the key-shaped holes comprising a wide part and a narrow part, and the position fixing means is secured to the ceiling portion of a vehicular body at one end thereof and includes a fixing portion for fixing a part of the position fixing means which has passed through the insert hole on the hood securing plate, the sectional shape of the position fixing means being defined in correspondence to the shape of the insert hole.

When a belt is inserted and passed through the insert hole on the hood securing plate, the latter is immovably held at the position where the hood is kept in an opened state.

With the engagement holes each comprising a wide part and a narrow part, the engagement members are first brought in engagement with the engagement holes using the wide parts and then they are displaced to the narrow parts in the lateral direction so as to prevent the engagement members from being disengaged from the engagement holes.

As will be readily apparent from the above description, the present invention provides the following advantageous effects.

(i) Since the hood securing plate is immovably held by the belt which is inserted and passed through the insert hole on the hood securing plate, the roof hood of the present invention has an excellent property of handling compared with the conventional one.

(ii) Since each of the engagement holes on the hood securing plate comprises a wide part and a narrow part, it is easy to perform an engaging operation with the minimized fear that the engagement members are disengaged from the engagement holes.

Other objects, features and advantages of the present invention will be more readily apparent from a reading of the following description which has been made with reference to the accompanying drawings.

BRIEF DESCRIPTION OF THE DRAWINGS

The present invention will be illustrated in the following drawings in which.

DETAILED DESCRIPTION OF THE PREFERRED EMBODIMENT

Now, the present invention will be described in a greater detail hereinafter with reference to the accompanying drawings which illustrate a preferred embodiment thereof.

Figure 1:
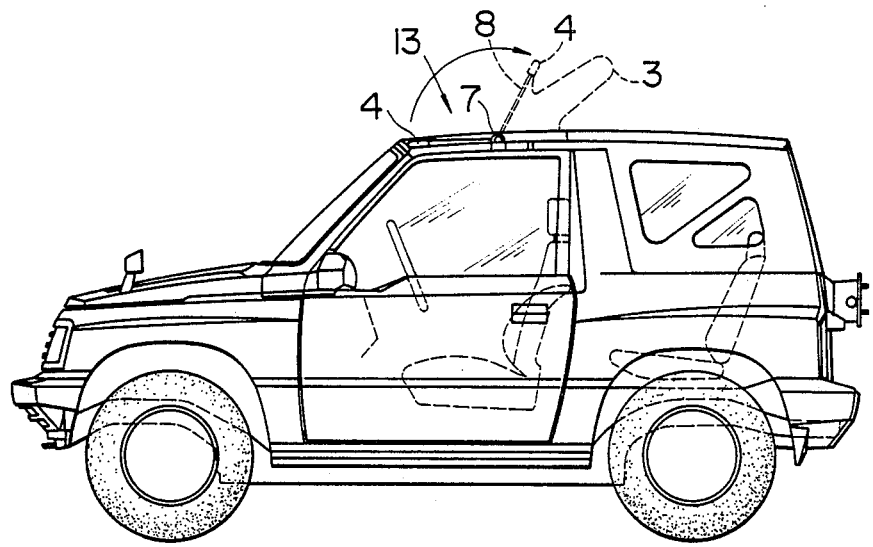
FIG. 1 is a side view illustrating a motorcar for which a vehicular openable roof hood in accordance with the present invention is employed.
Figure 2:
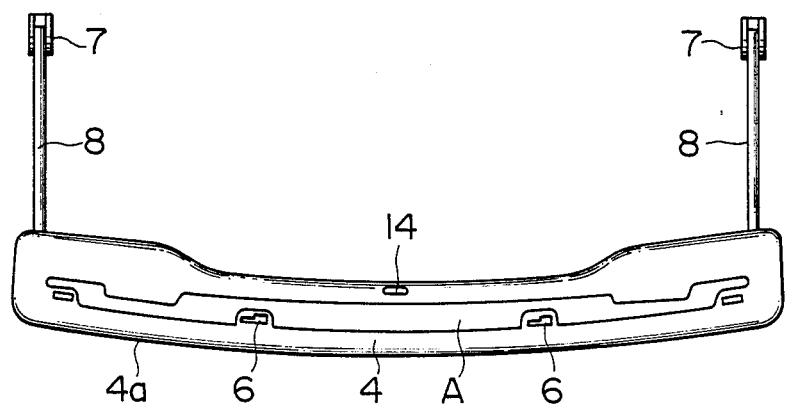
FIG. 2 is a plan view illustrating turnable arms and a hood securing plate for the vehicular openable securing plate of the present invention as seen from the above.

As shown in FIG. 1, a vehicular hood in accordance with the present invention is turnably secured to an opening portion 13 which is provided above the front seats of an automotive vehicle.

Specifically, arms 8 adapted to turn about pivotal shafts 7 secured to the roof of the vehicle is provided on the latter. The arms 8 are designed in a substantially inverted U-shaped configuration, respectively, and a hood securing plate 4 made of metallic material is fixed to the upper ends of the arms 8 by welding or the like process.

Figure 3:
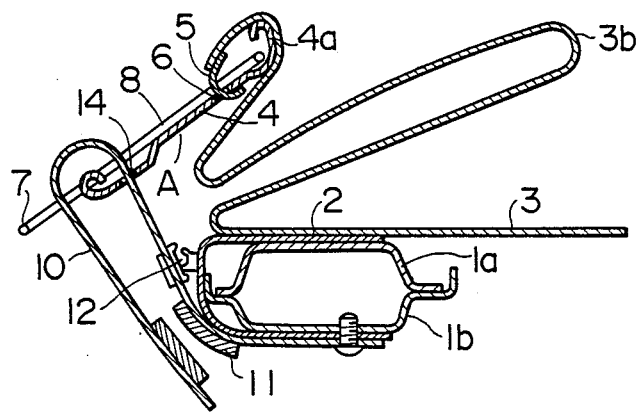
FIG. 3 is a sectional view of the vehicular openable roof hood of the present invention.

As shown in FIG. 3, a part of the hood securing plate 4 on the upper surface thereof identified by reference symbol A is recessed slightly. This prevents the part A of the hood securing plate 4 from coming in contact with a hood cloth 3. The hood cloth 3 is provided with substantially U-shaped engagement members 5 at the upper end thereof so that it is secured to the hood securing plate 4 in such a manner that it extends round the upper surface and the front edge of the hood engagement plate 4 until the engagement 5 members 5 are introduced into corresponding engagement holes 6 from the bottom side of the hood securing plate 4.

Figure 4:
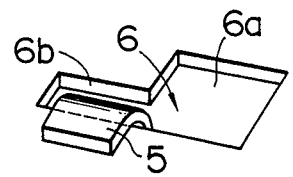
FIG. 4 is an enlarged perspective view illustrating one of engagement holes shown in FIG. 3.

As is best seen in FIG. 4, each of the engagement holes 6 comprises a wide part 6a and a narrow part 6b. Thus, the engagement members 5 are easily engaged with the hood securing plate 4 without fail by first introducing them into the wide parts 6a and then displacing them to the narrow parts 6b in the lateral direction.

As shown in FIG. 3, when the arms 8 are turned to immovably hold the hood 3 in an opened state, a belt 10 of which one end is fixed to the ceiling of the vehicle is extended through a hole 14 on the hood securing plate 4 and then other end of the belt 10 which has passed through the hole 14 is kept fixed using a Velcro fastener 11. As is apparent from the drawing, the belt 10 and the Velcro fastener 11 serve as position fixing means.

Figure 5:
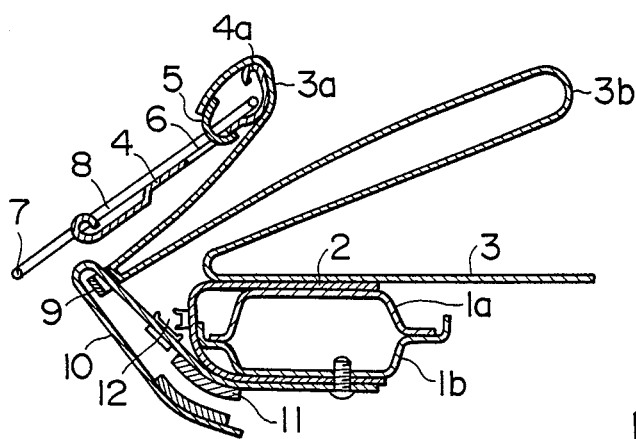
FIG. 5 is a sectional view illustrating a conventional vehicular openable roof hood.
Figure 6:
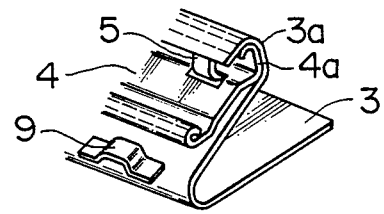
FIG. 6 is a fragmental perspective view particularly illustrating a hood securing plate for the conventional roof hood in FIG. 5 as seen from the back side.

The hood of the present invention shown in FIG. 3 is different from the conventional hood in FIG. 5 only in respects that the engagement holes 6 are different in shape and the hood securing plate 4 is formed with an insert hole 14 on the hood securing plate 4. Thus, same or similar components as those for the conventional hood in FIG. 5 are represented by same reference numerals but their repeated description will not be required.

I claim:

1. A vehicular openable roof hood for covering an opening portion on the upper surface of a roof of an automotive vehicle, said hood comprising a pair of arms adapted to turn about a pair of pivotal shafts on said roof, a hood securing plate fixed to the distal ends of said arms to immovably hold the distal end of the hood, a hood cloth extending round the upper surface and the front edge of said hood securing plate to be secured to the latter from the bottom side thereof and position fixing means for immovably holding the hood at a position where it is kept opened, wherein said hood cloth is provided with a plurality of engagement members each having a substantially U-shaped sectional configuration at the distal end thereof so as to allow it to be secured to the hood securing plate, the hood securing plate is formed with a plurality of key-shaped holes through which said engagement members are introduced so as to allow them to be held in an engaged state as well as an insert hole through which position fixing means is inserted, each of said key-shaped holes comprising a wide part and a narrow part, and said position fixing means is secured to the ceiling portion of a vehicular body at one end thereof and includes a fixing portion for fixing a part of the position fixing means which has passed through said insert hole on the hood securing plate, the sectional shape of the position fixing means being defined in correspondence to the shape of the insert hole.

* * * * *